(12) United States Patent
Eggers et al.

(10) Patent No.: US 6,534,171 B1
(45) Date of Patent: Mar. 18, 2003

(54) GAS-TIGHT LAMINATING FILM AND PACKAGING MATERIAL PRODUCED THEREFROM

(75) Inventors: Holger Eggers, Freiburg (DE); Gregor Kaschel, Bomlitz (DE)

(73) Assignee: Wolff Walsrode AG, Walsrode (DE)

(*) Notice: Subject to any disclaimer, the term of this patent is extended or adjusted under 35 U.S.C. 154(b) by 0 days.

(21) Appl. No.: 09/762,262

(22) PCT Filed: Jul. 27, 1999

(86) PCT No.: PCT/EP99/05369

§ 371 (c)(1),
(2), (4) Date: Feb. 1, 2001

(87) PCT Pub. No.: WO00/07815

PCT Pub. Date: Feb. 17, 2000

(30) Foreign Application Priority Data

Aug. 7, 1998 (DE) .......................................... 198 35 745

(51) Int. Cl.⁷ ........................ B32B 27/08; B65D 65/40
(52) U.S. Cl. ...................... 428/336; 428/215; 428/216; 428/332; 428/334; 428/335; 428/461; 428/463; 428/512; 428/513; 428/514; 428/516; 428/520
(58) Field of Search ................................. 428/215, 216, 428/334, 332, 335, 336, 461, 463, 512, 513, 514, 516, 520

(56) References Cited

U.S. PATENT DOCUMENTS

| | | | |
|---|---|---|---|
| 4,547,433 A | 10/1985 | Ohya et al. .................. | 428/516 |
| 4,726,984 A | 2/1988 | Shah ........................... | 428/216 |
| 5,298,326 A | 3/1994 | Norpoth ...................... | 428/349 |
| 5,318,829 A | 6/1994 | Tada et al. ................... | 428/213 |

FOREIGN PATENT DOCUMENTS

| | | |
|---|---|---|
| EP | 0 561 428 | 4/1998 |
| GB | 2134446 | 8/1984 |
| WO | 95/33621 | 12/1995 |

OTHER PUBLICATIONS

J. of Applied Polymer Science, vol. 51, pp. 89–103, Prasadarao Meka and Ferdinand C. Stehling, Heat Sealing of Semicrystalline Polymer Films. I. Calculation and Measurement of Interfacial Temperatures: Effect of Process Variable on Seal Properties, (month unavailable) 1994.

J. of Applied Polymer Science, vol. 51, pp. 121–131, James M. Farley and Prasadarao Meka, Heat Sealing of Semicrystalline Polymer Films. III. Effect of Cornoa Discharge Treatment of LLDPE, (month unavailable) 1994.

J. of Applied Polymer Science, vol. 51, pp. 105–119, Ferdinand C. Stehling and Prasadarao Meka, Heat Sealing of Semicrystalline Polymer Films. II. Effect of Melting Distribution on Heating–Sealing Behavior of Polyolefins, (month unavailable) 1994.

*Primary Examiner*—D. S. Nakarani
(74) *Attorney, Agent, or Firm*—Norris McLaughlin & Marcus

(57) ABSTRACT

Described is a heat sealable, multi-layer laminating film composed of at least six layers of thermoplastic polymers. The multi-layer laminating film has an inner layer of ethylene/vinyl alcohol copolymer (EVOH). Also described are packaging materials containing the multi-layer laminating film of the present invention.

20 Claims, No Drawings

GAS-TIGHT LAMINATING FILM AND PACKAGING MATERIAL PRODUCED THEREFROM

DESCRIPTION OF THE INVENTION

The present invention relates to a heat sealable, multi-layer laminating film composed of at least six layers of substantially thermoplastic polymers with an inner layer of ethylene/vinyl alcohol copolymer (EVOH), and to a packaging material containing said laminating film as a heat seal coating.

The invention also covers packaging materials which contain such a laminating film as a heat seal coating. The invention also provides the use of the laminating film and of the packaging materials containing them for the production of packagings, and the use of said packagings for packing foods and other articles.

Many articles require protection from the surrounding air or the surrounding atmosphere for transport and/or storage. They must be packed, therefore, in a manner which is suitable for excluding as completely as possible all or certain constituents of the surrounding atmosphere. A particularly critical constituent of the surrounding atmosphere is oxygen. The presence of oxygen may, in many packed products, such as, for example, foods, lead to oxidative spoilage or growth of bacteria which likewise spoil the packed product.

In many cases, such packagings are produced by heat sealing one or more conventional packaging materials to a packaging, for example, a bag or a lidded container. In so doing, the packaging material is firmly sealed by fusing the heat seal coating, in the example of the bag, against itself or, in the case of a lidded packaging, against the heat seal coating of another packaging material. A heat seal seam sealing the packaging is produced.

In many cases, the heat seal seam must meet very stringent requirements. The heat seal seam must be able to absorb high mechanical stresses caused by the contents of the package, transport or other influences. In many instances this applies immediately after sealing when the heat seal seam is still hot. For example, in so-called vertical form-fill seal machines, the contents are introduced into the formed tube when the transverse sealing instrument is still closed, for time reasons. When the sealing jaws are opened, the entire weight of the contents presses on the not yet cooled heat seal seam and thereby exposes this to a tensile stress. In other cases, even without an external stress, a similar type of load on the still hot heat seal seam may occur solely due to the resilience of the packaging material, for example, when sealing a fold or in the envelope region of the packaging material. If the cohesion of the heat seal seam is too low, the seam will lift in such cases and the packaging will thus fail. The seam strength in the hot state immediately after sealing is usually called hot tack. High hot tack is an important prerequisite for high packing speeds in cases of the kind described above.

A method of measurement for the property of hot tack is given in connection with the examples according to the invention. In qualitative terms, the measurement is carried out by bringing two sections of packaging material into contact with a defined pressure at a certain temperature and for a given time and then, whilst the heat seal seam is still hot, pulled apart. Whether and to what extent a time lag is permitted between releasing the sealing instrument and applying the force is particularly important here. It is possible to measure the maximum force which can be absorbed by the packaging material when pulled apart, or the resulting deformation of the heat seal seam for a given force. In principle, a distinction should be made between the hot tack force as the maximum force which can be absorbed, without failure, by the heat seal seam after sealing, and the hot tack temperature range as the temperature range in which a minimum level of hot tack force can be achieved under otherwise given sealing conditions.

In addition, the heat seal seam in the cooled state must form a strong seal, i.e. it must be able to absorb, in this state, high stresses to which the packaging may be exposed during transport or storage, without mechanical failure. It should be possible for a strong heat seal seam of this kind to be obtained with the shortest possible sealing times as an additional condition for an efficient, i.e. rapid and fault-free packaging process.

If voids, known as channels, occur between the inside and outside of the packaging, the surrounding atmosphere will penetrate and, under certain circumstances, the contents will be damaged. The sealing of folds is particularly critical here. The packaging may thus contain folds extending into the heat seal seam, intentionally in the form of a longitudinal fold at the side of a bag or at the intersection of the longitudinal and transverse seam, or unintentionally in the event of poor control in the machine. For tight sealing of such a fold, the heat seal coating must be rapidly and durably formable during the sealing process in order to fill in the region in and around the fold completely so that continuous contact between the inner surfaces of the heat seal coating(s) occurs along the heat seal seam even in the fold region. If the sealing times required to achieve a tight seal are too long, the processing speed of the film on the packaging machine will in turn be reduced.

The partial steps taking place during a sealing process are described by way of example in *Meka and Stehling, Heat Sealing of Semicrystalline Polymer Films. II. Effect of Melting Distribution on Heat-Sealing Behavior of Polyolefins, Journal of Applied Polymer Science*, Vol. 51, pgs. 105–119 (1994). Initially, wetting in the heat seal seam takes place due to melting and pressure. In the further course of the operation, chain segments of the polymers diffuse from both sides of the heat seal seam into the opposite side in each case and thus create molecular entanglements over and beyond the seam. After the sealing instrument has been removed, the seal cools and, with partially crystalline materials, crystals also develop over and beyond the seam. If the heat seal seam is mechanically stressed immediately after the sealing instrument is removed, the polymers of the heat seal seam must therefore exhibit a sufficiently high melt elasticity to be able to absorb this stress.

The short sealing times mentioned above may be achieved in particular by the fact that the required properties such as high seal strength, high hot tack and hermetic sealing are achieved at low temperatures. In this way, for a given temperature of the sealing instrument—in many cases this is limited by the heat resistance of the support or substrate of the packaging material—a temperature high enough to fulfil the requirements mentioned can be achieved in the heat seal seam in a relatively short time.

The following terms, methods of measurement and definitions apply to all further explanations:

Abbreviations for plastics according to DIN 7728 and ISO 1043-1987 (E) are used for the description of the polymers contained in the individual layers, unless otherwise identified.

In multi-layer structures, the layer sequence is reproduced by stringing together the abbreviations of the polymers of the corresponding layers or symbols explained in another way, separated from one another by vertical lines. The side of the heat seal coating is always on the right. Moreover, only a part of the whole sequence of layers that makes up the structure may be indicated. In these cases, the side of the heat seal coating is likewise always on the right, and layers or combinations of layers not indicated are identified by three dots, . . . Polymers of the same kind may be distinguished from one another by numbering, for example, in the form PE-LD-1|PE-LD-2|PE-LD-3. Mixtures of different polymers are identified by the + sign and the summary of the components in brackets ( ). Optionally, additional details about the percentage composition may be provided here. In such cases, unless otherwise stated, these are always proportions by weight which are based on the total weight of the mixture. For example, the expression . . . |PA|EVOH| . . . |(PE-LD-1+PE-LLD)|d describes a structure with an unspecified outer layer or external sequence of layers, followed by a layer composed substantially of polyamide, followed by a layer substantially of ethylene/vinyl alcohol copolymer (EVOH), followed by an unspecified layer or sequence of layers, followed by a layer comprising a mixture of a low density polyethylene provided with the number 1 (PE-LD-1) and an ethylene/ α-olefin copolymer (PE-LLD), and a layer following on the sealing side to be specified in more detail with d.

Layers which serve primarily to bond mechanically the layers adjacent to them on both sides are designated hereinafter by . . . |HV| . . . wherein HV is an abbreviation for coupling agent. Polymers typically used as coupling agents are described further below.

The melting point specification relates hereinafter to the value determined according to ASTM 3418 by DSC analysis (Differential Scanning Calorimetry Analysis).

The softening point specification relates hereinafter to the value determined according to ISO 306.

The melt flow rate specification relates hereinafter to the value determined according to DIN ISO 1133. If no further details are given, the measurement condition in the form of temperature and application weight is assumed to be condition D in DIN ISO 1133 with a temperature of 190° C. and an application weight of 2.16 kg.

The density of the raw materials relates to the method of measurement according to ISO 1183 (A).

As will be explained below, it is not possible to achieve both high hot tack and good seam integrity simultaneously with structures of oxygen-barrier heat seal coatings in packaging materials according to the prior art.

A high hot tack force is achieved by the choice of polymer in the case of heat seal coatings. Copolymers of ethylene and acrylic acids (E/AA, E/MAA) permit high hot tack forces and broad hot tack temperature ranges in view of the hydrogen bridge bonds between the molecules which are effective even at high temperatures. This is true to an even greater extent of ionomers, neutralised acid copolymers containing metal ions, because of the ionic bonding forces. The use of acid copolymers and ionomers is disadvantageous, however, in that, with relatively high acid contents and/or degrees of neutralisation which permit the properties mentioned in the first place, they are not for their part compatible with polyethylene-based polymers. This makes it impossible to use the heat seal coating for sealing with a further polyethylene-based heat seal coating, for example, in a lidded packaging, in view of the low heat seal seam strength which can be achieved in this way.

Experience has shown that, with non-polar sealing media such as low and high density polyethylene (PE-LD, PE-HD), copolymers of ethylene and α-olefins (PE-LLD), copolymers of ethylene and propylene (E/P) or polypropylene (PP), a relatively high hot tack can be achieved with a reduced MFR, i.e. with relatively long-chain polymers and as a result of relatively little long-chain branching. In the case of PE-LLD, the hot tack force can be markedly improved with types which were produced using metallocene catalysts, hereinafter known as mPE-LLD, and which, compared with conventional types produced with Ziegler-Natta catalysts, have a narrower molecular weight distribution and a more uniform distribution of the comonomer content over the molecules of different lengths. In all cases, an increase in density brings about only a small change in the hot tack force, but the temperature range is shifted towards higher values.

Copolymers of ethylene and vinyl acetate (EVA) or ethylene and unsaturated esters such as butyl acrylate or ethyl acrylate (E/BA, E/EA) achieve lower sealing temperatures with increasing comonomer content, but the hot tack force also decreases.

In order to achieve good seam integrity, polymers with a low melting point and a high MFR, i.e. low viscosity, are usually used. In this way, even at low sealing temperatures, the polymer of the heat seal coating is able to flow into irregularly shaped sections of the heat seal seam, as in the region of folds, and thereby seal them. These materials generally exhibit poor hot tack, however.

The requirement of high seal strength with short sealing times may also be met by a specific choice of the polymer(s) forming the heat seal coating. Thus, a good heat seal seam strength can also be obtained with polymers which themselves have a high tear strength. Such polymers are, in particular, copolymers of ethylene and α-olefins (PE-LLD) in the higher density range, i.e. with densities above about 0.910 g/cm$^3$. It is not possible, however, with said polymers, to obtain short sealing times comparable with those obtained using ethylene copolymers such as, for example, EVA, E/AA, E/MAA or the like. For greater ease of processing with approximately the same seam strength, the above-mentioned copolymers of ethylene and α-olefins may be blended with branched polymers such as PE-LD. In this way the sealing initiation temperature may also be shifted towards lower values, if necessary.

The following structures are described in the patent literature in this connection:

EP 560 495 discloses a five-layer film with the structure ethylene-polymer |HV|EVOH|HV|ethylene polymer wherein the coupling agent layers contain copolymers of an unsaturated carboxylic acid or one of its derivatives with propylene or copolymers of an unsaturated carboxylic acid or one of its derivatives with α olefin/propylene copolymers. This film can be shrunk under the influence of heat after prior stretching and is characterised by high resistance to folding, high seal strength and high toughness.

EP 561 428 discloses a five- or seven-layer film with the structure polymer|HV|EVOH|HV|polymer or polymer|HV|PA|EVOH|PA|HV|polymer, which in turn can be shrunk under the influence of heat after prior stretching.

U.S. Pat. No. 4,726,984 discloses a five-layer structure (E/P+PP)|HV|EVOH|HV|(EP+PP) which is claimed to permit high packaging speeds.

U.S. Pat. No. 4,547,433 discloses a five-layer structure PE-1|HV|EVOH|HV|PE-2, wherein PE-1 and PE-2 each contain a PE-LLD and optionally additional proportions of an EVA copolymer. The layer PE-1 is crosslinked, whereas PE-2 is not crosslinked, for better sealability. The film therefore has good shrink properties after stretching.

A feature common to the structures mentioned is that, in the composite with a substrate, they do not achieve a hermetic seal with good seam integrity with a hot tack suitable for high packaging speeds and a sufficiently high heat seal seam strength.

The object was, therefore, to provide a heat sealable, high oxygen-barrier laminating film for packaging materials which permits both high hot tack and a hermetic seal with good seal integrity with short sealing times, and hence permits, in the composite of a packaging material containing this sealing medium, relatively high packaging speeds. In addition, the heat seal coating should have a sufficiently high heat seal seam strength.

According to the invention, this was achieved by a laminating film which contains an inner layer (d) of an ethylene/vinyl alcohol copolymer (EVOH) which is enclosed on both sides by coupling layers (c) and (e). On the laminating side of this composite, the laminating film according to the invention contains at least one further layer (f) and on the sealing side an outer layer (a) and at least one further layer (b) which in each case contain a thermoplastic polymer or mixtures of thermoplastic polymers. The laminating film according to the invention is also characterised in that, with the exception of the EVOH-containing layer (d) and optionally of the coupling layers (c) and (e) enclosing the EVOH layer, each of the other layers containing a thermoplastic polymer or mixtures of thermoplastic polymers and not situated outside on the sealing side has a lower softening point than layer (a) situated outside on the sealing side.

DETAILED DESCRIPTION OF THE INVENTION

The heat sealable, multi-layer laminating film according to the invention is characterised by a high oxygen barrier effect and improved sealing properties, particularly by a combination of high heat seal seam strength immediately after sealing and rapid hermetic sealability without the formation of channels in the heat seal seam. As a result, very high processing speeds on packaging machines of conventional design may be achieved in the composite with a substrate.

The laminating film according to the invention is composed preferably of an outer layer (a) on the seal side, followed towards the laminating side by a thermoplastic layer (b), followed in turn by a coupling layer (c), a layer (d) containing an ethylene/vinyl alcohol copolymer, a further coupling layer (e), a further thermoplastic layer (f), the softening points of layers (b) and (f) being lower than the softening point of layer (a). The softening point of layers (b) and (f) is preferably 5° C., particularly preferably 10° C. lower than the softening point of layer (a).

In the preferred form, the softening points of the material compositions that make up layers (c) and (e) are also lower than the softening point of the material forming layer(a).

A particularly advantageous embodiment of the laminating film according to the invention is one in which the softening points of the coupling layers (c) and (e) are at least 5° C., in a particularly preferred form at least 10 C. lower than the softening point of the material forming layer (a).

Layer (a) of the laminating film according to the invention preferably has a thickness of at least 3 $\mu$m and at most 30 $\mu$m, in an even more suitable form at most 15 $\mu$m and in a particularly preferred embodiment at most 10 $\mu$m auf.

The sum of the weights per unit area of layers (b) and (f) and of further layers which have a lower softening point than layer (a) is, based on the weight per unit area of the total laminating film, preferably at least 30%, more preferably at least 40%, particularly preferably at least 50%.

The thickness of layer (d) is preferably 3 $\mu$m to 15 $\mu$m, more preferably 4 $\mu$m to 10 $\mu$m and particularly preferably from 4 $\mu$m to 8 $\mu$m.

Layers (a), (b) and (f) and optionally further layers containing a thermoplastic polymer or mixtures of thermoplastic polymers contain preferably polymers or mixtures of polymers from the group comprising polypropylene (PP), copolymers of ethylene and propylene (E/P), copolymers of ethylene and vinyl acetate (EVA), particularly preferably with a vinyl acetate content, based on the total weight of the polymer, of at most 20%, copolymers of ethylene and unsaturated esters such as butyl acrylate or ethyl acrylate (E/BA or E/EA), copolymers of ethylene and unsaturated carboxylic acids (E/AA, E/MAA), particularly preferably with a carboxylic acid comonomer content, based on the total weight of the polymer, of at most 15%, in an even more preferred form at most 8%, salts of the copolymers of ethylene and unsaturated carboxylic acids, particularly E/MAA, (ionomers), particularly preferably with a carboxylic acid comonomer content, based on the total weight of the ionomer, of at most 15%, in an even more preferred form at most 10%, low density polyethylene (PE-LD), particularly preferably in a density of at least 0.91 g/cm$^3$ and at most 0.935 g/cm$^3$, high density polyethylene (PE-HD), copolymers (PE-LLD) of ethylene and a olefins having at least 3 carbon atoms, such as, in particular, butene, hexene, octene, 4-methyl-1-pentene. The copolymers (PE-LLD) of ethylene and $\alpha$ olefins may be prepared with conventional catalysts or with metallocene catalysts. Copolymers (PE-LLD) of ethylene and $\alpha$ olefins with a density of at least 0.90 g/cm$^3$ and at most 0.94 g/cm$^3$ are particularly preferred.

Layer (a) contains, of the polymers mentioned, preferably PE-LLD, PE-LD, EVA, E/AA, E/MAA or ionomers or mixtures of the substances mentioned. Embodiments with mixtures of PE-LLD and a branched polymer such as EVA or preferably PE-LD are particularly preferred, the content by weight of the PE-LLD in this mixture being from 50% to 100%. The PE-LLD may be prepared either with Ziegler-Natta catalysts or with metallocene catalysts. An embodiment of layer (a) with a composition with a melt flow rate, measured at 190° C. and an application weight of 2.16 kg, of at least 0.1 g/10 min and at most 3 g/10 min, particularly preferably at least 0.5 g/10 min and at most 2 g/10 min, is advantageous.

An embodiment in which layer (a) contains an ionomer of the kind described above is also advantageous. In this case, a structure of the layer sequence according to the invention which contains, in layer (b), a copolymer of ethylene and unsaturated carboxylic acids (E/AA, E/MAA) is also advantageous.

Layers (b) and (f) contain, of the above-mentioned polymers, particularly preferably polymers or mixtures of polymers from the group comprising EVA, particularly preferably with a vinyl acetate content, based on the total weight of the polymer, of at least 4% and at most 20%, PE-LD, particularly preferably in a density of at least 0.91 g/cm$^3$ and at most 0.925 g/cm$^3$, E/AA or E/MAA, particularly preferably with a carboxylic acid comonomer content, based on the total weight of the polymer, of at least 4% and at most 15%, in an even more preferred form at least 4% and at most 8%. Layers (b) and (f) contain preferably a composition with a melt flow rate, measured at 190° C. and with an application weight of 2.16 kg, of at least 0.1 g/10 min and at most 3 g/10 min, particularly preferably at least 0.5 g/10 min and at most 2 g/10 min.

Layer (d) contains preferably at least 50 wt. %, based on its total weight, of an EVOH with at least 40 mole % and at most 85 mole % of vinyl acetate, which is at least 90% saponified.

Layers (c) and (e) contain an extrudable coupling agent. Coupling agents used in preference are modified polyolefins such as, in particular, polyethylene, polypropylene, ethylene/propylene copolymers, ethylene/α olefin copolymers or ethylene/vinyl acetate copolymers which are grafted with at least one monomer from the group comprising the α,β monounsaturated dicarboxylic acids, such as, in particular, maleic acid, fumaric acid, itaconic acid or the acid anhydrides, acid esters, acid amides and acid imides thereof. In addition, extrudable coupling agents which may be used include copolymers of ethylene with α,β monounsaturated dicarboxylic acids such as acrylic acid, methacrylic acid and/or metal salts thereof with zinc or sodium and/or the alkyl ($C_1$–$C_4$) esters thereof which may also be grafted with at least one monomer from the group comprising the α,β monounsaturated dicarboxylic acids such as, in particular, maleic acid, fumaric acid, itaconic acid or the acid anhydrides, acid esters, acid amides and acid imides thereof. In addition, polyolefins such as, in particular, polyethylene, polypropylene, ethylene/propylene copolymers or ethylene/α olefin copolymers which are grafted with copolymers of ethylene with α,β monounsaturated dicarboxylic acids such as acrylic acid, methacrylic acid and/or the metal salts thereof with zinc or sodium and/or the alkyl($C_1$–$C_4$) esters thereof may also be used. Particularly suitable coupling agents are polyolefins, particularly ethylene/α olefin copolymers with grafted on α,β monounsaturated dicarboxylic acid anhydride, particularly maleic anhydride. Layers (c) and (e) may also contain an ethylene/vinyl acetate copolymer, preferably with a vinyl acetate content of at least 20 wt. %.

In a special embodiment of the laminating film, layer (a), layer (b) or both layers contain, in addition to the polymers already mentioned, a further thermoplastic raw material which is not miscible with the polymers contained in layer (a), in order to obtain a peelable seal. The thermoplastic raw material is preferably polybutylene. Favourable concentrations of the thermoplastic raw material range from 5 wt. % to 25 wt. %, based on the total weight of the layer in which the thermoplastic raw material is contained.

All or individual layers of the laminating film may additionally be provided with conventional additives which improve the functional properties of the film. Examples include solid inorganic particles well known as antiblocking agents which project out of the external surface of the heat seal coating and in this way improve the surface slip behaviour of the film. Silica, calcium carbonate, magnesium silicate, aluminium silicate, calcium phosphate, talc and the like are suitable for this purpose. Silica is used in preference. Effective amounts lie in the range from 0.05 wt. % to 2 wt. %, preferably 0.1 wt. % to 0.8 wt. %. The average particle size is from 1 μm to 10 μm, preferably 2 μm to 5 μm, particles with a spherical shape being particularly suitable here. These particles are used preferably only in layer (a).

Other additives which improve the surface slip of the film, also in their combined action with the solid particles mentioned, include the higher aliphatic acid amides, higher aliphatic acid esters, waxes, metal soaps and polydimethyl siloxanes usually known as lubricants. The effective amount of lubricants is in the range from 0.01 wt. % to 3 wt. %, preferably 0.02 wt. % to 1 wt. %. The addition of higher aliphatic acid amides in the range from 0.01 to 0.25 wt. % is particularly suitable. An aliphatic acid amide particularly suitable for the above-mentioned polymers used in the laminating film is erucic acid amide.

The laminating film according to the invention may also be coloured by the addition of conventional colorants.

The laminating film according to the invention may also contain other conventional additives such as antifogging agents or antistatic agents. Esters of fatty acids are used here in preference. Optionally ethoxylated esters of carboxylic acids and polyhydric alcohols, particularly of sorbic acid, stearic acid or oleic acid and glycerol are particularly suitable.

In a preferred form, the laminating film is pretreated on the laminating side with conventional processes to obtain increased surface tension.

It is possible, with the multi-layer laminating film according to the invention, to provide a high oxygen-barrier sealing medium which can be integrated in a packaging material, which medium is characterised not only by good hot tack but surprisingly also by high seam integrity. A packaging material containing the laminating film according to the invention permits unexpectedly high packaging speeds on packaging machines of conventional design, with a low proportion of leaky or inadequately sealed packs.

The invention also provides, therefore, a packaging material containing the heat sealable, multi-layer laminating film according to the invention and the use of said packaging material, particularly for packing foods, tea, coffee and tobacco products, medical products and products of any kind which are packed with a modified atmosphere whose composition does not correspond to the surrounding atmosphere, or which are perishable in the presence of moisture and/or oxygen.

The laminating film according to the invention and the packaging material containing it can be prepared on conventional plant for the production of multi-layer composites. The packaging material according to the invention containing the laminating film may be, in particular, a composite with a flexible substrate, preferably of paper, paperboard, metal, textiles or plastic, selected in particular from the group comprising paper, aluminium, cellulose film, polypropylene, polyalkylene terephthalate, polyamide, polycarbonate, polyvinyl alcohol, EVOH, polystyrene or combinations thereof, and the thermoplastic substrates may be orientated or unoriented.

The substrate and the laminating film according to the invention are pre-prepared separately and bonded to the packaging material according to the invention by the use of a laminating adhesive.

The laminating film according to the invention may be prepared by coextrusion as blown film or lay-flat film on conventional plant. Alternatively, the multi-layer heat seal coating according to the invention may also be prepared by extrusion coating, that is, the application of one or more layers of the laminating film in the molten state to the other layers present in the solid state, or by extrusion laminating, that is, the application of one or more molten layers of the laminating film between two layers of the laminating film present in the solid state.

The laminating film according to the invention may also undergo an orientation process. Orientation may be carried out only in the longitudinal direction, only in the transverse direction, initially in the longitudinal and then in the transverse direction, simultaneously in the longitudinal and transverse direction, or in combinations of these steps. Orientation may be carried out with the laminating film according to the invention on its own or with the packaging material containing it.

EXAMPLES

Example 1

A laminating film with the structure EVA|HV-1|EVOH|HV-1|EVA|(80% PE-LLD+20% PE-LD-1) with the layer thicknesses 10|5|5|5|20|5 µm was prepared by coextrusion as blown film and laminated to a packaging material with a laminating adhesive against commercial biaxially oriented polyamide having a thickness of 15 µm.

PE-LD-1 has a density of 0.923 g/cm$^3$, a melting point of 108° C., a softening point of 96° C. and an MFR of 2 g/10 min and is provided with 500 ppm of erucic acid amide and 1000 ppm of silica with an average particle size of 15 µm. PE-LLD is an ethylene-octene copolymer with a density of 0.920 g/cm$^3$, a melting point of 124° C., a softening point of 100 C. and an MFR of 1.1 g/10 min. EVA has a vinyl acetate content of 4.5%, a density of 0.928 g/cm$^3$, a melting point of 105° C., a softening point of 87° C. and an MFR of 2 g/10 min. HV-1 is an EVA grafted with maleic anhydride with a density of 0.935 g/cm$^3$, a melting point of 100° C., a softening point of 77° C. and an MFR of 2 g/10 min. EVOH is an ethylene/vinyl alcohol copolymer with an ethylene content of 32%, a melting point of 183° C. and an MFR of 1.7 g/10 min.

Comparison Example 2

Packaging material of example 1, wherein the heat seal coating has the structure (80% PE-LLD+20% PE-LD-1)|HV-2|EVOH|HV-2|(80% PE-LLD+20% PE- LD-1) with the layer thicknesses 15|5|5|5|20 µm and materials as in example 1 and was prepared as in example 1. HV-2 is a PE-LLD grafted with maleic anhydride with a density of 0.920 g/cm$^3$, a melting point of 124° C., a softening point of 98° C. and an MFR of 2 g/10 min.

Comparison Example 3

Packaging material of example 1, wherein the heat seal coating has the structure EVA|HV-1|EVOH|HV-1|EVA with the layer thicknesses 15||5|5|5|20 µm and materials as in example 1 and comparison example 2 and was prepared as in example 1.

The following properties were measured on the example of film according to the invention and on the comparison examples:

Seal strength
  Two fault-free, clean sample strips are taken from the film web to be tested. For the purpose of sealing, they are placed one on top of the other with the surfaces to be sealed and held in this way between the sealing jaws such that the sample overhangs at least 1 cm on each side. Heat sealing takes place perpendicular to the direction of film travel. The sealing jaws are smooth and heated on both sides to the nominal sealing temperature. Sealing takes place in the standard manner for 0.5 seconds with a pressure of 50 N/cm$^2$. Comparison measurements for shorter sealing times were also carried out by way of example.

In the tables that follow, data given without stating the sealing time always refer to a sealing time of 0.5 s. Test conditions deviating from this are stated. After cooling, a 15 mm wide test strip is cut out of the heat seal seam thus prepared and tested on a tensile testing machine with a speed of 100 mm/min and a clamping distance of 20 mm. The maximum value of the force required to separate the sealed films is known as the seal strength.

Hot tack force
  Sample strips about 90 mm long and 45 mm wide are taken from the material to be tested in the direction of web travel and, with the sealing sides against one another, tensioned in the sample holder. Sealing takes place under the same conditions as regards the sealing instrument, pressure and time as for the seal strength, i.e. over a distance of 20 mm. Immediately after the seal test has ended, the strength test of the hot heat seal seam is carried out at a pull off speed of 25 m/min. The force curve is measured electronically and stored by PC. The maximum value of the force is read off from a graphic representation of the force curve.

Seam integrity
  The material to be tested is cut out in the 20×20 cm format and folded over at one edge with the sides to be sealed. This edge is then sealed in the manner described under "seal strength", and the resulting heat seal seam is known as the "longitudinal seam". The tube thus formed is then sealed in the same way on one of the tranverse sides still open, with the longitudinal seam laid flat. The longitudinal seam laid flat forms a fold in so doing. An approximately 5 mm deep pool of methanol stained with methylene blue is poured into the half-bag thus formed into the seam gusset of the longitudinal and tranverse seam. Any channels in the seam are shown up by the methylene blue solution penetrating through them. It is noted whether leaks occur or whether the transverse seam is tightly sealed over its entire width.

The results are summarised in the table below:

| Characteristic | Unit | Example or comparison example | | |
|---|---|---|---|---|
| | | Ex. 1 | C. ex 2 | C. ex 3 |
| Seal strength at 90° C. | N/15 mm | 0.1 | 0.2 | 1.8 |
| Seal strength at 100° C. | N/15 mm | 0.5 | O.3 | 9.5 |
| Seal strength at 110° C. | N/15 mm | 7.5 | 5.8 | 35.4 |
| Seal strength at 120° C. | N/15 mm | 40.1 | 43.9 | 33.2 |
| Seal strength 130° C. | N/15 mm | 41.2 | 42 | 32.1 |
| Maximum hot tack force at 90° C. | N/45 mm | 0 | 0 | 2.2 |
| Maximum hot tack force at 100° C. | N/45 mm | 7.3 | 6.9 | 5.9 |
| Maximum hot tack force at 110° C. | N/45 mm | 23.9 | 27.3 | 7.2 |
| Maximum hot tack force at 120° C. | N/45 mm | 37.5 | 43.1 | 4.5 |
| Maximum hot tack force at 130° C. | N/45 mm | 30.8 | 34.2 | 2.8 |
| Channels in bag on sealing 100° C. | Yes/no | Yes | Yes | Yes |
| Channels in bag on sealing 110° C. | Yes/no | No | Yes | No |
| Channels in bag on sealing 120° C. | Yes/no | No | Yes | No |
| Channels in bag on sealing 130° C. | Yes/no | No | Yes | No |
| Seal strength at 120° C., sealing time = 0.25 s | N/15 mm | 38.9 | 35.6 | 34.1 |
| Maximum hot tack force at 120° C., sealing time = 0.25 s | N/45 mm | 40.3 | 39.7 | 6.8 |

-continued

| Characteristic | Unit | Example or comparison example | | |
|---|---|---|---|---|
| | | Ex. 1 | C. ex 2 | C. ex 3 |
| Channels on sealing 120° C., sealing time = 0.25 s | Yes/no | No | Yes | No |

Properties of films according to the invention and comparison samples

The required hermetic seal is thus achieved by the heat seal coating according to the invention in the embodiment shown by way of example at much lower sealing temperatures than with comparable types of the prior art. Hot tack and seal strength are not adversely affected. The absence of channels achieved at lower temperatures also means, however, that this is possible at the same sealing temperature and with a shorter sealing time. This fact is verified by halving the sealing time by way of example.

What is claimed is:

1. Heat sealable, multi-layer laminating film composed of at least seven layers consisting of an outer layer (a) on the sealing side, followed towards the laminating side by a layer (b), followed in turn by a coupling layer (c), a layer (d) consisting of at least 50% by weight, based on its total weight, of an ethylene/vinyl alcohol copolymer, a coupling layer (e) and on the laminating side at least one layer (f) wherein layers (a), (b) optionally the coupling layers (c) and (e) and layer(s) (f) contain a thermoplastic polymer or a mixture of thermoplastic polymers and the softening point of layers (b), (f) and optionally (c) and (e) is lower than the softening point of layer (a).

2. The laminating film of claim 1, wherein the softening points of layers (b) and (f) and of all the other layers containing a thermoplastic polymer or mixtures of thermoplastic polymers are at least 5° C. lower than the softening point of layer (a).

3. The laminating film of claim 2, wherein the softening points of layers (b) and (f) and of all the other layers containing a thermoplastic polymer or mixtures of thermoplastic polymers are at least 10° C. lower than the softening point of layer (a).

4. The laminating film of claim 1, wherein the softening points of the coupling layers (c) and (e) are lower than the softening point of layer (a).

5. The laminating film of claim 4, wherein the softening points of layers (c) and (e) are at least 5° C. lower than the softening point of layer (a).

6. The laminating film of claim 5, wherein the softening points of layers (c) and (e) are at least 10° C. lower than the softening point of layer (a).

7. The laminating film of claim 1, wherein the thickness of layer (a) is at least 3 μm and at most 30 μm.

8. The laminating film of claim 1, wherein the weight per unit area of all the layers which have a lower softening point than layer (a), based on the weight per unit area of the total laminating film, is at least 30% in total.

9. The laminating film of claim 1, wherein the thickness of layer (d) is 3 μm to 15 μm.

10. The laminating film of claim 1, wherein the layers (a), (b) and (f) and optionally further layers containing a thermoplastic polymer or mixtures of thermoplastic polymers contain polymers or mixtures of polymers selected from the group consisting of polypropylene, copolymers of ethylene and propylene, copolymers of ethylene and vinyl acetate (EVA), copolymers of ethylene and unsaturated esters, copolymers of ethylene and unsaturated carboxylic acids (E/AA, E/MAA), salts of copolymers of ethylene and unsaturated carboxylic acids (ionomers), polybutylene, low density polyethylene (PE-LD), high density polyethylene (PE-HD) and copolymers (PE-LLD) of ethylene and α olefins having at least 3 carbon atoms which may be prepared with conventional or with metallocene catalysts.

11. The laminating film of claim 10, wherein the unsaturated esters of the copolymers of ethylene and unsaturated esters are butyl acrylate or ethyl acrylate.

12. The laminating film of claim 1, wherein layer (a) contains a composition with a melt flow rate, measured at 190° C. and with an application weight of 2.16 kg, of at least 0.1 g/10 min and at most 3 g/10 min.

13. The laminating film of claim 1, wherein layers (c) and/or (e) contain an extrudable coupling agent of the group of modified polyolefins with carboxyl groups, acid esters, acid amides and acid imides thereof, or an extrudable coupling agent selected from or composed of the group consisting of copolymers of ethylene with α,β monounsaturated dicarboxylic acids, the metal salts thereof with zinc or sodium, the alkyl($C_1$–$C_4$) esters or corresponding graft polymers on polyolefins which are graft polymerised with the unsaturated acids mentioned, or contain an ethylene/vinyl acetate copolymer with a vinyl acetate content of at least 20 wt. % as extrudable coupling agent.

14. The laminating film of claim 13, wherein said extrudable coupling agent is polyethylene, polypropylene, ethylene/propylene copolymer, ethylene/α-olefin copolymer or ethylene/vinyl acetate copolymer.

15. The laminating film of claim 13, wherein said α,β-monounsaturated dicarboxylic acids of said copolymers of ethylene with said α,β-monounsaturated dicarboxylic acids are selected from the group consisting of acrylic acid and methacrylic acid and said polyolefins of said corresponding graft polymers on polyolefins are selected from the group consisting of polyethylene, polypropylene, ethylene/propylene copolymers and ethylene/α-olefin copolymers.

16. The laminating film of claim 1, wherein one or more layers contains further organic or inorganic additives selected from pigments, colorants, lubricants, antiblocking agents, antistatic agents and antifogging agents.

17. The laminating film of claim 1, wherein the laminating side is pretreated to obtain an increased surface tension.

18. A packaging material containing a laminating film according to claim 1 in a composite with a flexible substrate.

19. The packaging material of claim 18, wherein the flexible substrate is composed of a member selected from plastic, metal, cardboard, paper, paperboard and textiles.

20. A method of packing foods, tea, coffee, tobacco products or medical products or other products which are perishable in the presence of moisture and/or oxygen, or products which are packed in a modified atmosphere, which comprises packaging same in the heat sealable, multi-layer laminating film of claim 1.

* * * * *